United States Patent
Li

(10) Patent No.: US 10,896,151 B2
(45) Date of Patent: Jan. 19, 2021

(54) METHOD AND APPARATUS FOR PROVIDING A VISUAL INDICATION OF THE COPY HISTORY

(71) Applicant: Nokia Technologies Oy, Espoo (FI)

(72) Inventor: Xiaoping Li, Beijing (CN)

(73) Assignee: Nokia Technologies Oy, Espoo (FI)

( * ) Notice: Subject to any disclaimer, the term of this patent is extended or adjusted under 35 U.S.C. 154(b) by 676 days.

(21) Appl. No.: 15/327,163

(22) PCT Filed: Aug. 8, 2014

(86) PCT No.: PCT/CN2014/084042
§ 371 (c)(1),
(2) Date: Jan. 18, 2017

(87) PCT Pub. No.: WO2016/019589
PCT Pub. Date: Feb. 11, 2016

(65) Prior Publication Data
US 2017/0185620 A1 Jun. 29, 2017

(51) Int. Cl.
*G06F 16/16* (2019.01)
*G06F 16/17* (2019.01)

(52) U.S. Cl.
CPC ........ *G06F 16/168* (2019.01); *G06F 16/1734* (2019.01)

(58) Field of Classification Search
CPC .......................... G06F 16/168; G06F 16/1734
See application file for complete search history.

(56) References Cited

U.S. PATENT DOCUMENTS

2005/0286787 A1* 12/2005 Yagiura ................. G06F 16/93
382/239
2006/0265425 A1 11/2006 Raft, II et al.
2007/0073937 A1 3/2007 Feinberg et al.
(Continued)

FOREIGN PATENT DOCUMENTS

CN 101320368 A 12/2008
CN 101325082 A 12/2008
(Continued)

OTHER PUBLICATIONS

"Iphoto Library Manager", Fatcat Software, Retrieved on Jan. 16, 2017, Webpage available at : https://www.fatcatsoftware.com/iplm/.
(Continued)

*Primary Examiner* — Jorge A Casanova
(74) *Attorney, Agent, or Firm* — Mendelsohn Dunleavy, P.C.; Yuri Gruzdkov

(57) ABSTRACT

A method, apparatus, and computer program product are provided to facilitate the copying of files by reducing the repeated copying of the same file and by permitting files to be stored in a coherent manner. In the context of a method, representations of each of a plurality of files that have been stored in a first storage location are caused to be presented. The method also accesses information regarding a copy history of the plurality of files that have been previously copied to another storage location and causes a visual indication of the copy history to be presented in conjunction with the representations of the plurality of files that have been previously copied to another storage location.

17 Claims, 5 Drawing Sheets

(56) References Cited

U.S. PATENT DOCUMENTS

| | | | | |
|---|---|---|---|---|
| 2008/0101651 A1* | 5/2008 | Matsunoshita | .... | H04N 1/00867 |
| | | | | 382/100 |
| 2009/0190183 A1* | 7/2009 | Hosoda | ........ | G06T 1/0071 |
| | | | | 358/3.28 |
| 2011/0066668 A1* | 3/2011 | Guarraci | ........ | G06F 16/27 |
| | | | | 707/831 |
| 2015/0248465 A1* | 9/2015 | Yan | ............ | G06F 11/1448 |
| | | | | 707/647 |
| 2018/0004750 A1* | 1/2018 | Mochizuki | .......... | G06F 17/218 |

FOREIGN PATENT DOCUMENTS

| | | |
|---|---|---|
| CN | 103812909 A | 5/2014 |
| CN | 103823813 A | 5/2014 |

OTHER PUBLICATIONS

International Search Report and Written Opinion received for corresponding Patent Cooperation Treaty Application No. PCT/CN2014/084042, dated May 13, 2015, 12 pages.

\* cited by examiner

METHOD AND APPARATUS FOR PROVIDING A VISUAL INDICATION OF THE COPY HISTORY

RELATED APPLICATION

This application was originally filed as PCT Application No. PCT/CN2014/084042 filed Aug. 8, 2014.

TECHNOLOGICAL FIELD

An example embodiment of the present invention relates generally to facilitating storage of files and, more particularly, to providing a visual indication of the copy history of one or more files.

BACKGROUND

Users of computing devices, such as users of mobile terminals, commonly store a number of files, at least temporarily, upon their computing device. Users may copy the files from their computing device to another computing device, memory device or storage location for archival purposes, for file management or for any of a myriad of other reasons. Users may copy the files on a monthly or other periodic basis or repeatedly at a less-defined interval when the user has time or otherwise remembers to copy the files.

By way of example, a user may capture a relatively large number of photographs with their mobile telephone, e.g., smartphone. These photographs may be locally stored by the mobile terminal, at least initially. The photographs may consume a substantial portion of the memory of the mobile telephone and, as a result, may limit the storage of other files. The local storage of photographs or other files also runs a risk of being lost if the mobile telephone is lost or damaged. As such, users may copy the photographs to another computing device or memory device. For example, users may periodically copy their photographs to their personal computer, laptop computer, or the like in order to archive the photographs, to store the photographs in various libraries or folders so as to provide structure or organization to the photographs, and to otherwise safeguard the photographs in case the mobile telephone is subsequently lost or damaged.

However, users may sometimes copy files to another computing device without deleting the files from the computing device on which the photographs were initially stored. As such, when the user subsequently proceeds to again copy files to another computing device, the user may have difficulty determining the files that were previously copied to the other computing device. For example, in an instance in which a user connects their mobile telephone to their personal computer in order to copy the photographs captured by the mobile telephone to the personal computer, the user may not be able to determine the photographs that were previously copied to the personal computer and, as such, may not be able to readily distinguish the photographs that have not yet been copied to the personal computer from those that have been previously copied to the personal computer. As such, the same files, such as the same photographs, may be repeatedly copied to different locations, such as different folders, of the other computing device. Moreover, users who are copying their files from one computing device to another at different instances in time may cause the files to be stored in an inconsistent manner or may otherwise simply forget the locations in which files were previously copied from one computing device to another. As such, the same files may not only be repeatedly copied to another computing device, but may be stored at different locations on the other computing device.

The repeated copying of the same files from one computing device to another computing device unnecessarily consumes computing resources including processing resources, communication resources and storage resources. Moreover, the inadvertent storage of the same files in different locations on the same computing device also unnecessarily consumes storage resources, thereby limiting storage available for the storage of other, different files.

BRIEF SUMMARY

A method, apparatus and computer program product are provided in accordance with an example embodiment in order to facilitate the copying of files. In this regard, the method, apparatus and computer program product of an example embodiment may be configured to provide a visual indication of the copy history to facilitate the subsequent copying of files in a manner that conserves the computing resources. By providing a visual indication of the copy history, a user may more readily avoid repeated copying of the same file, such as from a mobile terminal to another computing device, thereby conserving processing, transmission and storage resources. Further, by providing a visual indication of the copy history, files may be copied in a consistent manner such that the files are stored in the same location or otherwise in a coherent manner, thereby further conserving processing, transmission and storage resources by facilitating the subsequent retrieval of the files.

In an example embodiment, a method is provided that includes causing presentation of representations of each of a plurality of files that have been stored in a first storage location. The method of this example embodiment also accesses information regarding a copy history of the plurality of files that have been previously copied to another storage location. In this example embodiment, the method also causes a visual indication of the copy history to be presented in conjunction with the representations of the plurality of files that have been previously copied to another storage location. In an example embodiment, the method may access information regarding the copy history and cause a visual indication of the copy history to be presented in response to the receipt of user input requesting the copy history.

At least some of the files may not have been previously copied to another storage location. Thus, the method of an example embodiment may cause the visual indication of the copy history to be presented by causing the representation of the files that have not been previously copied to another storage location to be visually distinguishable from the representations of the files that have been previously copied to another storage location. In this regard, the method may cause the representations of the files that have not been previously copied to another storage location to be visually distinguishable by causing the representations of the files that have not been previously copied to another storage location to be presented without any visual indication of a copy history.

The information regarding the copy history may identify the storage location to which each of the files has been previously copied. In this regard, the method may cause a visual indication of the copy history to be presented in a manner that visually indicates the respective storage location to which a file was previously copied. In this example embodiment, the method may cause a visual indication of the copy history to be presented by, for each group of one or more files that were previously copied to a respective storage location, causing a background surrounding the representation of the one or more files that were previously copied to a respective storage location to be presented that is visually distinct from the background surrounding the representation of the one or more files that were previously copied to another storage location. The method of this example embodiment may also include causing a legend to be presented that indicates the respective storage location to which one or more files have been previously copied.

In another example embodiment, an apparatus is provided that includes at least one processor and at least one memory including computer program code with the at least one memory and the computer program code configured to, with the processor, cause the apparatus to at least cause presentation of representations of each of a plurality of files that have been stored in a first storage location. The at least one memory and the computer program code may also be configured to, with the processor, cause the apparatus of this example embodiment to access information regarding the copy history of the plurality of files that have been previously copied to another storage location. The at least one memory and the computer program code may further be configured to, with the processor, cause the apparatus of this example embodiment to cause a visual indication of the copy history to be presented in conjunction with the representations of the plurality of files that have been previously copied to another storage location. In an example embodiment, the at least one memory and the computer program code may be further configured to, with the processor, cause the apparatus to receive user input requesting the copy history with the at least one memory and the computer program code being configured to, with the processor, cause the apparatus of this example embodiment to access information and cause a visual indication of the copy history to be presented in response to receipt of the user input requesting the copy history.

At least some of the files may not have been previously copied to another storage location. In this instance, the at least one memory and the computer program code may be configured to, with the processor, cause the apparatus to cause a visual indication of the copy history to be presented by causing the representations of the files that have not been previously copied to another storage location to be visually distinguishable from the representations of the files that have been previously copied to another storage location. The at least one memory and the computer program code may be configured to, with the processor, cause the apparatus of this example embodiment to cause the representations of the files that have not been previously copied to another storage location to be visually distinguishable by causing the representations of the files that have not been previously copied to another storage location to be presented without any visual indication of a copy history.

The information regarding the copy history may identify the storage location to which each of the files has been previously copied. The at least one memory and the computer program code may also be configured to, with the processor, cause the apparatus of this example embodiment to cause a visual indication of the copy history to be presented in a manner that visually indicates the respective storage location to which a file was previously copied. The at least one memory and the computer program code may be further configured to, with the processor, cause the apparatus of this example embodiment to cause a visual indication of the copy history to be presented by, for each group of one or more files that were previously copied to a respective storage location, causing a background surrounding the representation of the one or more files that were previously copied to a respective storage location to be presented that is visually distinct from the background surrounding the representation of the one or more files that were previously copied to another storage location. The at least one memory and the computer program code may be further configured to, with the processor, cause the apparatus of this example embodiment to cause a legend to be presented that indicates the respective storage location to which the one or more files have been previously copied.

In a further example embodiment, a computer program product is provided that includes at least one non-transitory computer-readable storage medium having computer-executable program code portions stored therein with the computer-executable program code portions including program code instructions for causing a presentation of representations of each of a plurality of files that have been stored in a first storage location. The computer-executable program code portions of this example embodiment also include program code instructions for accessing information regarding a copy history of the plurality of files that have been previously copied to another storage location. The computer-executable program code portions of this example embodiment further include program code instructions for causing a visual indication of the copy history to be presented in conjunction with the representations of the plurality of files that have been previously copied to another storage location.

At least some of the files may not have been previously copied to another storage location. In this example embodiment, the program code instructions for causing a visual indication of the copy history to be presented may include program code instructions for causing the representations of the files that have not been previously copied to another storage location to be visually distinguishable from the representations of the files that have been previously copied to another storage location. In this example embodiment, the program code instructions for causing the representations of the files that have not been previously copied to another storage location to be visually distinguishable may include program code instructions for causing the representations of the files that have not been previously copied to another storage location to be presented without any visual indication of a copy history.

The information regarding the copy history may identify the storage location to which each of the files has been previously copied. In this example embodiment, the program code instructions for causing a visual indication of the copy history to be presented may include program code instructions for causing a visual indication of the copy history to be presented in a manner that visually indicates a respective storage location to which a file was previously copied. In this example embodiment, the program code instructions for causing a visual indication of the copy history to be presented may also include, for each group of one or more files that were previously copied to a respective storage location, program code instructions for causing a background surrounding the representation of the one or more files that were previously copied to a respective storage location to be presented that are visually distinct from the background surrounding the representation of the one or more files that were previously copied to another storage location. In this example embodiment, the computer-executable program code portions may further include program code instructions for causing a legend to be presented that indicates the respective storage location to which one or more files have been previously copied.

In yet another example embodiment, an apparatus is provided that includes means for causing presentation of representations of each of a plurality of files that have been stored in a first storage location. The apparatus of this example embodiment also includes means for accessing information regarding a copy history of the plurality of files that have been previously copied to another storage location. In this example embodiment, the apparatus further includes means for causing a visual indication of the copy history to be presented in conjunction with the representations of the plurality of files that have been previously copied to another storage location.

BRIEF DESCRIPTION OF THE DRAWINGS

Figure 1:
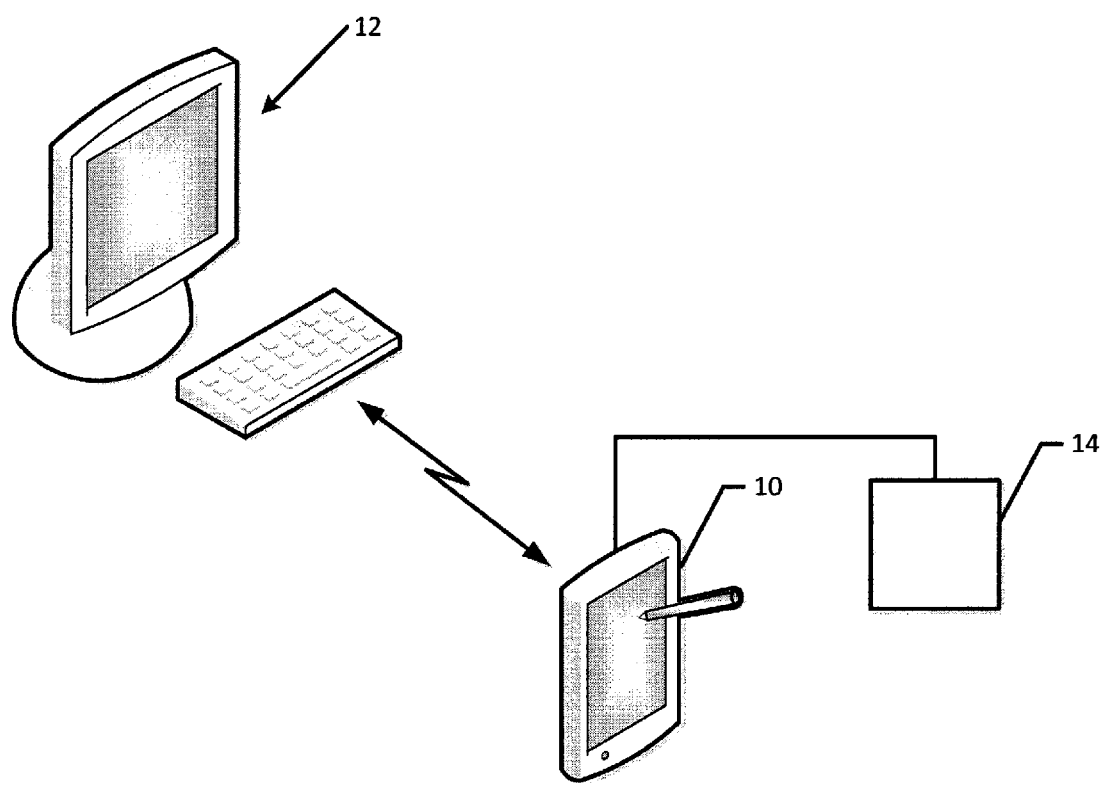
Figure 2:
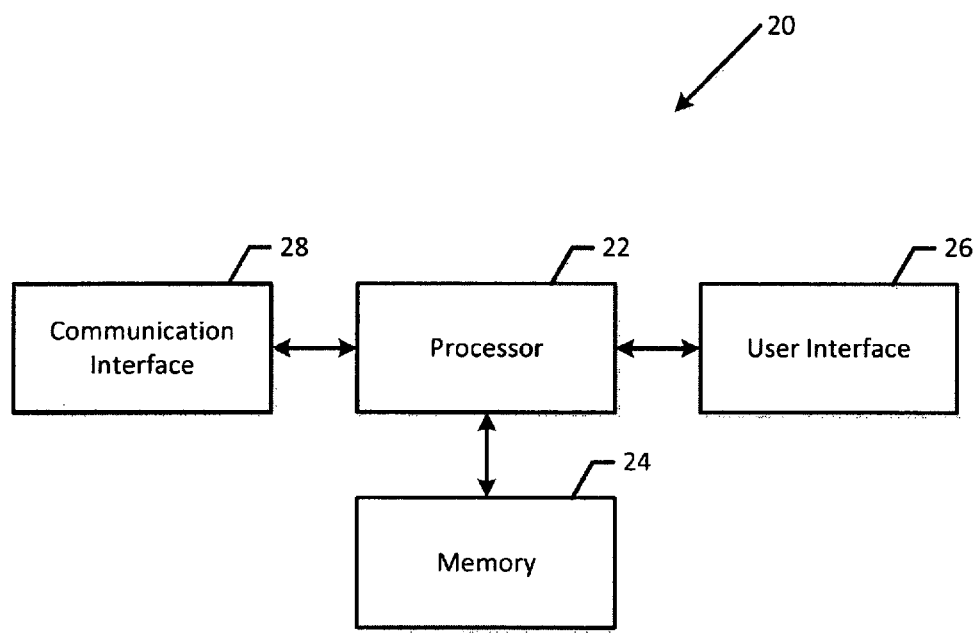
Figure 3:
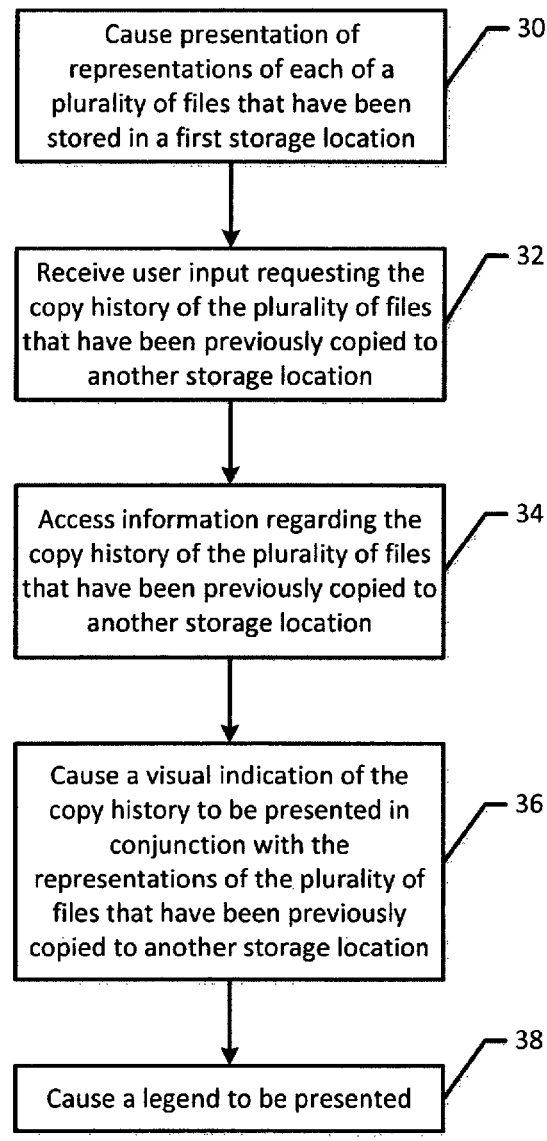
Figure 4:
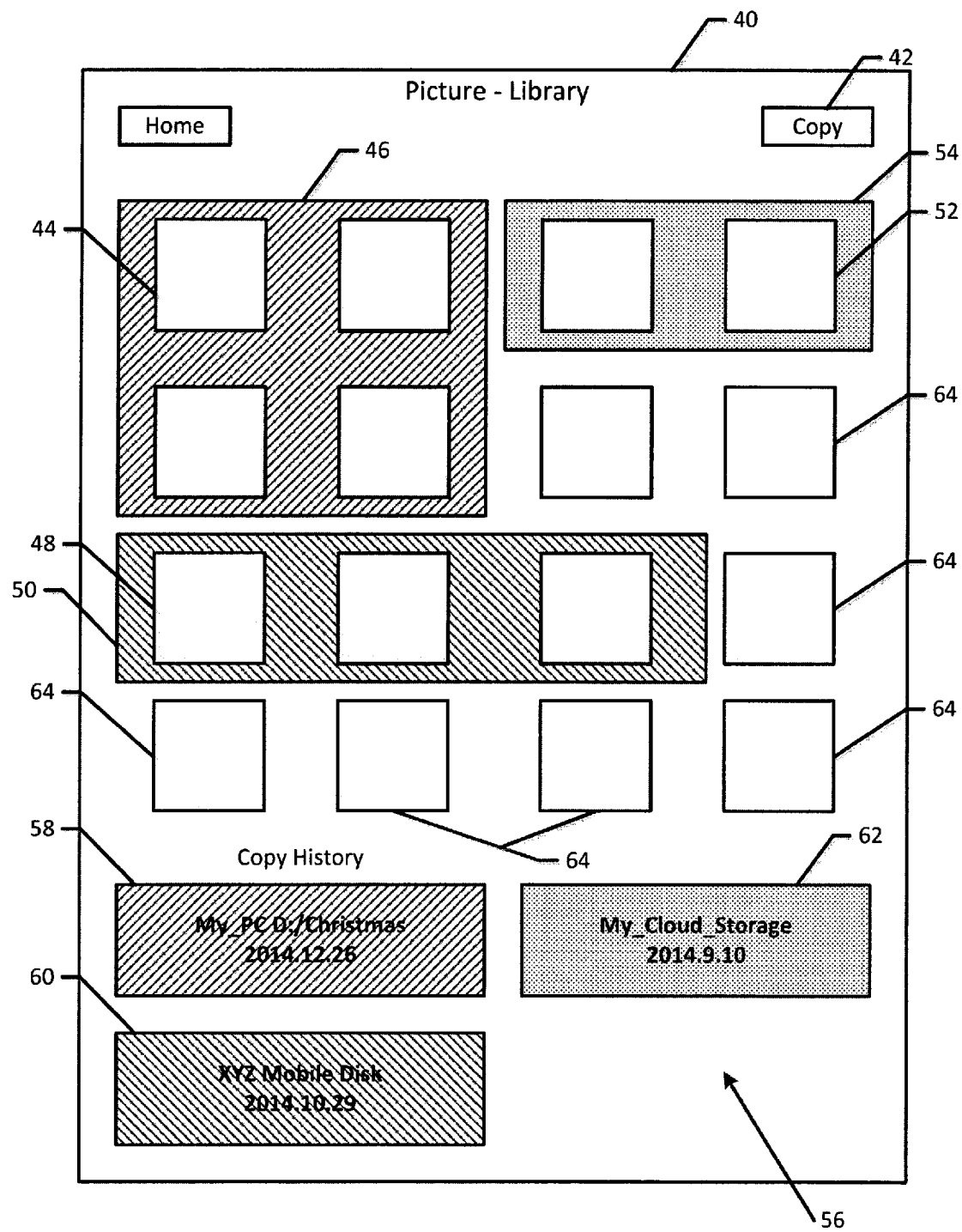
Figure 5:
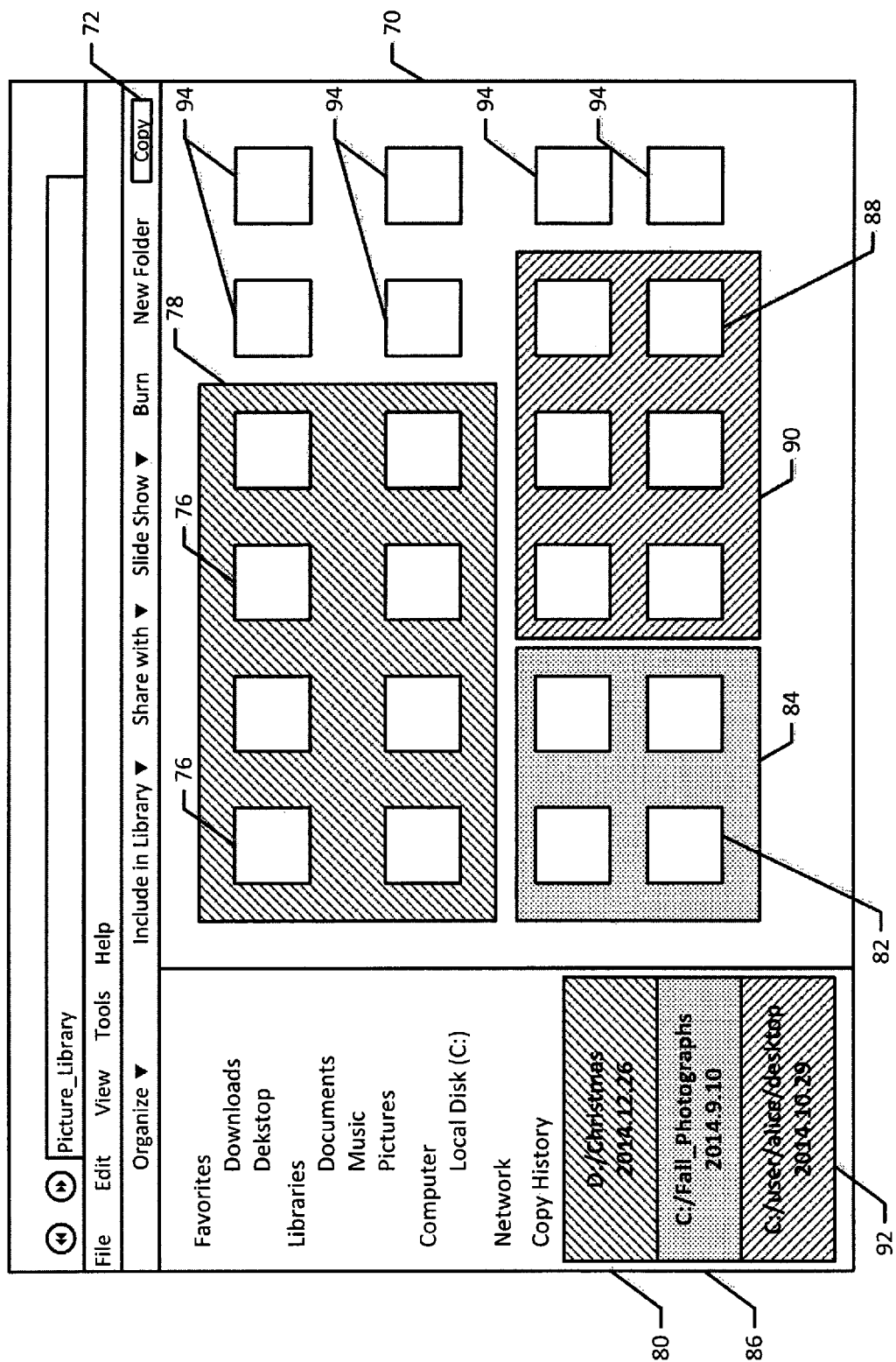

Having thus described certain example embodiments of the present disclosure in general terms, reference will now be made to the accompanying drawings, which are not necessarily drawn to scale, and wherein:

FIG. 1 is a schematic representation of a mobile terminal configured to copy files to one or more remote storage locations, such as remote storage locations maintained by a personal computer and/or an external memory device;

FIG. 2 is a block diagram of an apparatus that may be specifically configured in accordance with an example embodiment of the present invention;

FIG. 3 is a flowchart illustrating operations performed, such as by the apparatus of FIG. 2, in accordance with an example embodiment of the present invention;

FIG. 4 is a representation of an example user interface screen that may be presented to provide a visual indication of the copy history in accordance with an example embodiment of the present invention in which some of the files have been previously copied to various remote storage locations; and FIG. 5 is a representation of another example user interface screen that may be presented to provide a visual indication of the copy history in accordance with another example embodiment of the present invention in which some of the files have been previously copied to various local storage locations, such as various folders.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment in order to facilitate the copying of files, such as to another computing device, to a memory device or to another storage location. In this regard, the method, apparatus and computer program product may be configured to cause a visual indication of the copy history to be presented. As such, a user may refer to the copy history that is presented and, as a result, reduce, or eliminate, the instances in which the same file is repeatedly copied, thereby conserving processing, transmission and storage resources. Further, a user may refer to the copy history that is presented and may cause other files to be copied in a consistent manner, thereby facilitating subsequent access to the files and further conserving processing and storage resources.

Referring now to FIG. 1, an example embodiment in which one or more files are copied from a first computing device 10 to another storage location is illustrated. In the illustrated embodiment, the files are copied to another storage location that is remote from and offboard of the first computing device. However, the files may alternatively be copied to another storage location local to the first computing device in other embodiments. By way of example but not of limitation, the first computing device that initially stores the files in a first storage location may be a mobile terminal, such as a personal digital assistant (PDA), mobile telephone, smartphone, companion device, for example, a smart watch, pager, mobile television, gaming device, laptop computer, camera, tablet computer, touch surface, video recorder, audio/video player, radio, electronic book, positioning device (for example, global positioning system (GPS) device), or any combination of the aforementioned, and other types of voice and text communications systems. As a result of its mobility, the mobile terminal may have less storage capacity and may be at a greater risk of loss, damage or the like than other storage devices, such as other computing devices or memory devices.

In the example embodiment of FIG. 1, a user may repeatedly, such as periodically, place the mobile terminal 10 in communication with another storage device in order to permit files to be copied from the mobile terminal to the other storage device. In this regard, the mobile terminal may be placed in communication with another storage device via any of a variety of wireless communication techniques, such as cellular or other network-based wireless communication techniques or proximity-based wireless communications techniques, e.g., Bluetooth, WiFi, wireless local area network (WLAN) or the like. Alternatively, the mobile terminal may be placed in communication with another storage device via a wireline connection. Regardless of the manner in which the mobile terminal is placed in communication with the other storage location, the user may then cause one or more files that are stored by the mobile terminal to be copied to and stored by the other storage device at a location that is identified to the mobile terminal.

The files may be copied to any of a variety of other storage locations. For example, the files may be copied to another computing device 12, such as a personal computer, a laptop computer, a server or the like. In some instances, the files copied to another computing device are stored in a folder or in some other file structure. As such, the location within the other computing device to which the files are copied is identified to the mobile terminal 10. Alternatively, the files may be copied to an external memory device 14, such as an external hard drive, cloud or network-based storage or the like. In this instance, the files may also be stored in a particular folder or in some other file structure maintained by the external memory device with the location to which the files are copied being identified to the mobile terminal.

Although illustrated in FIG. 1 and described below by way of example in conjunction with the copying of the files from one computing device 10 to a storage location that is remote from and onboard of the first computing device, such as by copying the files to a different computing device 12 or to an external memory device 14, the method, apparatus and computer program product of an example embodiment may also be configured to facilitate copying of the files from one location to another on a first computing device, such as from one folder to another folder on the first computing device. For example, the files may be copied from a temporary folder to a more permanent folder to facilitate the organization and storage of the files.

The method, apparatus and computer program product of an example embodiment may be configured to copy a wide variety of different types of files and to maintain the copy history for a wide variety of different types of files. As described below, the files may be photographs that have been captured by a mobile terminal 10 and are copied to another computing device 12, an external memory device 14 or the like. However, the files may, instead, be documents, music files, video files or any of a wide variety of different types of files.

As shown in FIG. 2, an apparatus 20 in accordance with an example embodiment of the present invention is depicted. The apparatus may be embodied by or otherwise associated with a mobile terminal as described above. Alternatively, the apparatus may be embodied by or otherwise associated with a fixed computing device, such as a computer workstation, a personal computer, a server or the like. Regardless of the manner in which the apparatus is embodied or the computing device with which the apparatus is associated, the apparatus may include or otherwise be in communication with a processor 22, a memory device 24, a user interface 26 and optionally a communication interface. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor. Still further, the memory device may store, at least temporarily, a plurality of files, such as photographs, documents, audio files, video files or the like. Alternatively, the files may be stored remotely and accessed by the processor, such as via a communication interface.

As noted above, the apparatus 20 may be embodied by various devices. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of the illustrated embodiment also includes or is in communication with a user interface 26. The user interface, such as a display, may be in communication with the processor 22 to provide output to the user and, in some embodiments, to receive an indication of a user input, such as in an instance in which the user interface includes a touch screen display. In some embodiments, the user interface may also include a keyboard, a mouse, a joystick, touch areas, soft keys, one or more microphones, a plurality of speakers, or other input/output mechanisms. In an example embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 24, and/or the like).

The apparatus 20 of the illustrated embodiment may also optionally include a communication interface 28 that may be any means such as a device or circuitry embodied in either hardware or a combination of hardware and software that is configured to receive and/or transmit data from/to a communications device in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

Referring now to FIG. 3, the operations performed, such as by the apparatus 20 of FIG. 2, in accordance with an example embodiment are depicted. As shown in block 30, the apparatus may include means, such as the processor 22, the user interface 26 or the like, for causing presentation of representations of each of a plurality of files that have been stored in a first storage location. As noted above, the files may be any of a wide variety of different types, but, in an example embodiment, are photographs. In regards to the storage of the files in a first storage location, the files may be stored by the apparatus, such as the memory device 24 of the apparatus, or by a computing device that embodies or is otherwise associated with the apparatus. Alternatively, the files may not stored by the apparatus, but may be accessible by the apparatus during a copying operation. Moreover, the files may be represented in a variety of manners. In an example embodiment, however, a file may be represented by an icon, such as a thumbnail or other graphic representation. Alternatively, the files may be represented by a listing of the plurality of files that identifies each file, such as by title.

As shown in FIG. 4, a user interface screen 40 presented by the display of a mobile terminal 10 in accordance with an example embodiment is depicted. In this example embodiment, thumbnails of a plurality of photographs that have been locally stored, such as by memory device 24 of the apparatus 20 embodied by or associated with the mobile terminal may be presented. As shown, the thumbnails of the photographs may be presented in a rectangular grid-like pattern. However, in other example embodiments, the thumbnails or other representations of the files that have been stored in the first storage location may be presented in other manners. Although not depicted, the title or an abbreviated version of the title and/or other information associated with each of the files, such as the date of creation, may also be presented in conjunction with the respective thumbnails in order to provide additional context for each photograph.

As shown in block 32 of FIG. 3, the apparatus 20 may also include means, such as the processor 22, the user interface 26 or the like, for receiving user input requesting a copy history of the plurality of files. The user input may be provided in a variety of manners. In the example embodiment of the user interface screen 40 depicted in FIG. 4, the user may provide a copy input, such as by clicking on or otherwise selecting a copy button 42, in order to request the copy history. Although the apparatus, such as the processor, the user interface or the like, may be configured to receive a request for the copy history in the example embodiment, the apparatus, such as the processor, the user interface or the like, of other example embodiments need not receive a user input request of the copy history, but may cause presentation of the copy history in any event without the user input.

As shown in block 34 of FIG. 3, the apparatus 20 may also include means, such as the processor 22, the user interface 26 or the like, for accessing information regarding the copy history of the plurality of files that have been previously copied to another storage location. Although of variety of different types of information regarding the copy history of the plurality of files may be accessed, the information regarding the copy history may, in an example embodiment, provide an indication as to whether or not the respective files have been copied and, if a file has been copied, may provide an indication as to the location to which the file was copied, such as an indication of the storage device, such as the computing device or memory device, to which the file was copied and, in some instances, the location, such as the folder or the like, to which the file was copied. Additionally, the information regarding the copy history may provide an indication of the files that have not yet been copied to storage device. The information regarding the copy history of the plurality of files may be stored by the memory device 24 or by another storage device, such as by a server, by another computing device utilized by the same user, or the like.

As shown in block 36 of FIG. 3, the apparatus 20 may also include means, such as the processor 22, the user interface 26 or the like, for causing a visual indication of the copy history to be presented in conjunction with representations of the plurality of files that have been previously copied to another storage location. The visual indication of the copy history permits a user to readily discriminate between the files that have been previously copied and the files that have not been previously copied. In some embodiments, the user may also readily determine the location to which the files that have been previously copied have been stored. Thus, a user may more selectively cause the files that have not yet been copied to be copied and, in one embodiment, may copy the files that have not yet been copied to a storage device, such as another computing device or an external storage device, in a manner consistent with the file structure and organization imposed upon the other files that have been previously copied. For example, the files that have not yet been copied may be caused to be copied to the same location to which other files were previously copied in an instance in which the files relate to the same subject matter, are from the same time period, or the like. As such, the resulting storage of the files by another storage device, such as another computing device 12, an external memory device 14 or the like, may be more consistent and coherent, thereby facilitating the subsequent retrieval of the files in a manner that conserves processing and storage resources. Moreover, the visual indication of the copy history may alert the user as to the files that have been previously copied such that a user need not unnecessarily copy the same file again. The user may, instead, avoid recopying the same file while being assured that the files have already been transferred to another storage device, such as another computing device or external memory device.

In an example embodiment, at least some of the files have not been previously copied to another storage location. For example, these files may have been created following the most recent time at which files were copied, such as to another storage device, or these files were not copied at that time for some reason. In this example embodiment, the apparatus 20, such as the processor 22, the user interface 26 or the like, may be configured to cause a visual indication of the copy history to be presented by causing the representations of the files that have not been previously copied to another storage location to be visually distinguishable from the representations of the files that have been previously copied to another storage location. As such, the user may readily and accurately determine the files that have been previously copied and which, therefore, do not need to be copied again to another storage location from the files that have not yet been copied to another storage location and which should receive consideration for such copying. The representations of the files that have not been previously copied to another storage location may be visually distinguishable from the representations of the files that have been previously copied to another storage location in various manners. For example, the apparatus, such as the processor, the user interface or the like, may be configured to cause the representations of the files that have not been previously copied to another storage location to be presented without any visual indication of the copy history. In contrast, the representations of the files that have been previously copied to another storage location may be presented with a visual indication of the copy history. Although this visual distinction between the representations of the files that have been previously copied to another storage location from the files that have not yet been copied to another storage location may be provided in various manners, the user interface screen 40 of FIG. 4 depicts an example embodiment in which a background that surrounds the representations of the files is provided with the background providing a visual indication as to whether a respective file has been previously copied to another storage location.

In this example embodiment, a modified background having any cross-hatching, shading, stippling or other visual modification from the background that would otherwise be presented in the absence of the copy history may indicate the files were previously copied to another storage location. In this example embodiment, the representations of the files that are surrounded by the modified background are associated with files that have been previously copied to another storage location. In contrast, the absence of such a modified background and the presentation, instead, of the same background that would otherwise be presented in the absence of the copy history may indicate the files that have not been previously copied to another storage location. For example, the representations of the files that are not surrounded by the modified background, but that are, instead, surrounded by the same background that would otherwise be presented in the absence of the copy history are associated with files that have not been previously copied to another storage location.

Although the files that have not been previously copied to another storage location are described above to be denoted by the absence of any modified background, the files that have not been previously copied to another storage location may, instead, be indicated by a modified background that surrounds the files that have not yet been copied. However, the modified background that surrounds the files that have not yet been copied is different than the modified background that surrounds the files that have been previously copied to another storage location, thereby permitting the files that have not yet been copied to be visually distinguished from the files that have been previously copied.

In regards to accessing information regarding the copy history of the plurality of files that have been previously copied to another storage location, the apparatus 20, such as the processor 22, may be configured to identify the storage location to which each of the files have been previously copied, such as by identifying the other computing device 12, the external memory device 14 or the like and, in some instances, the storage location, e.g., the drive, the folder, etc., of the other computing device, the external memory device or the like to which the file was copied. In this regard, the apparatus, such as the processor, the user interface 26 or the like, may be configured to cause a visual indication of the copy history to be presented in a manner that visually indicates the respective storage location to which a file was previously copied. For example, the background that surrounds the representation(s) of one or more files may not merely be indicative of the storage device to which the file was copied, but may also indicate the storage location of the respective storage device to which the file was copied. As such, a user may readily and accurately determine not only that a file was previously copied, but the storage location to which the file was previously copied. As such, computing resources, such as processing, transmission and storage resources, may be conserved by avoiding unnecessary, repeated copying of the same file and by causing other files to be subsequently stored in a consistent manner with that in which files were previously copied to a respective storage location, such as by copying similar files to the same storage location, e.g., the same folder, thereby providing improved file organization and facilitating efficient identification and access to the files following copying.

As shown in the user interface screen 40 of FIG. 4, the apparatus 20 of an example embodiment may cause the visual indication of the copy history to be presented in a different manner for each group of one or more files that were previously copied to different, respective storage locations. By way of example, the apparatus, such as the processor 22, the user interface 26 or the like, may be configured to cause the background surrounding the representation of the one or more files that were previously copied to a respective storage location to be presented in a manner that is visually distinct from the background surrounding the representation of the one or more files that were previously copied to another storage location. As shown in FIG. 4, for example, the thumbnails 44 associated with files that have been previously copied to another computing device, e.g., a personal computer, at a storage location designated My_PC/ D:/Christmas may be surrounded by a background 46 having rightwardly leaning cross-hatching, while the thumbnails 48 associated with the files that were previously copied to a first external memory device, e.g., the XYZ Mobile Disk, may be surrounded by a background 50 having leftwardly leaning cross-hatching and the thumbnails 52 associated with the files that were previously copied to a second external memory device, e.g., My_Cloud_Storage, may be surrounded by a background 54 having stippling. In this manner, the apparatus, such as the processor, the user interface or the like, may provide an indication not only that the files have been previously copied, but the particular storage location to which the files were copied. In an example embodiment, the storage locations to which files were previously copied may be identified in terms of a particular computing device or external memory device. Alternatively, the storage location may be identified in a more granular manner by identifying the folder or other storage structure within which the files were previously copied. In this example embodiment, different types of background may be associated with the representations of files copied to the same storage device computer with the different backgrounds being indicative of different folders maintained by the storage device to which the files were copied.

As shown in block 38 of FIG. 3, the apparatus 20 may also include means, such the processor 22, the user interface 26 or the like, for causing a legend 56 to be presented that indicates the respective storage locations to which one or more files have been previously copied. The legend may be provided in various manners, but, in an example embodiment depicted in FIG. 4, the legend may associate the different types of background with different storage locations. In this regard, the legend may indicate the name or designation of a storage location, such as a computing device or an external memory device to which the file was previously copied, and, in an example embodiment, may identify the folder or other storage structure maintained by the other computing device or the external memory device to which the file was copied. For example, the legend of FIG. 4 includes a first entry 58 that associates the background with rightwardly leaning cross-hatching with the files previously copied to My_PC/D:/Christmas, a second entry 60 that associates the background with leftwardly leaning cross-hatching with the files previously copied to the XYZ Mobile Disk and a third entry 62 that associates the stippled background with the files previously copied to My_Cloud_Storage. Additionally, the legend may also optionally provide other information, such as a date of creation or a date of last update, for one or more of the storage locations.

The files that have not yet been copied may also be associated with a modified background, albeit a different background than those associated with the files that have been previously copied to another storage location. However, the representations of the files that have not yet been copied, such as the thumbnails 64 in the example embodiment of FIG. 4, may be surrounded in accordance with an example embodiment, not with a modified background as described above in conjunction with the files that have been previously copied, but with the same background that would be present in the absence of the copy history. Thus, the files that have not yet been copied can be readily distinguished from the files that have been previously copied.

While described above in conjunction with the copying of files from one computing device, such as a mobile terminal 10, to another storage device, such as another computing device 12 or an external memory device 14, the method, apparatus and computer program product may be configured to facilitate copying a file to another storage location on the same computing device. For example, the apparatus 20 may be embodied by a personal computer and may be configured to facilitate copying of one or more files to a more specific folder or library in order to facilitate organization of the files, thereby allowing more efficient retrieval of the files at a later date. As such, in this example embodiment, computing resources, such as processing and storage resources, may be conserved by avoiding or reducing instances of repeated copying of the same file and processing resources may be conserved in regards to subsequent retrieval of the previously copied file by the user as a result of facilitating consistent storage of the files, such as by consistently storing the files in the same manner within a folder structure.

As shown by the user interface screen 70 of FIG. 5, thumbnails representative of the photographs that have been locally stored by a computing device, such as a personal computer, may be presented, such as in response to user input, e.g., actuation of the copy button 72. In addition, a visual indication of the copy history of the photographs may be presented, such as by providing a modified background that surrounds each group of files that has been previously copied to a respective storage location, such as to a respective drive and/or folder. In this example embodiment, the computing device includes each storage location to which the files have been copied. As denoted by the legend 74, the files associated with thumbnails 76 surrounded by the background 78 with rightwardly leaning cross-hatching have been previously copied to a folder designated D:/Chrismas as indicated by the first entry 80 of the legend, the files associated with thumbnails 82 surrounded by the stippled background 84 have been previously copied to a folder designated C:/Fall_Photographs as indicated by the second entry 86 of the legend, and the files associated with thumbnails 88 surrounded by the background 90 with leftwardly leaning cross-hatching have been previously copied to the folder designated C:/user/alice/desktop as indicated by the third entry 92 of the legend. Additionally, the files that are associated with thumbnails 94 not surrounded by a modified background in this example embodiment have not been previously copied. As such, a user may consider copying the files that have not been previously copied and may do so in a manner consistent with the manner in which the other files were previously copied, such as to the same storage locations in instances in which the files relate to the same or similar subject matter. As such, the files may be stored in a consistent manner to facilitate storage and subsequent retrieval of the files, thereby conserving processing and storage resources. Further, a user may avoid repeatedly copying the same file since the user will be aware of which files have been previously copied and which files have not been previously copied, thereby also conserving processing and storage resources.

As described above, FIG. 3 is a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    causing presentation on a screen of representations of each of a plurality of files that are stored in a first storage location;
    accessing information regarding a copy history of the plurality of files, the copy history indicating which of the files have been previously copied from the first storage location to any one of two or more other storage locations, said information identifying, for each of the previously copied files, at least one of the two or more other storage locations; and
    causing a visual indication of the copy history to be presented in conjunction with the representations of the plurality of files;
    wherein said causing the visual indication of the copy history comprises causing visual indications of the copy history of the files previously copied to different ones of the two or more other storage locations to be presented on the screen in different respective manners visually distinct from one another; and
    wherein the method further comprises causing a legend to be presented that indicates, for each of the previously copied files, the at least one of the two or more other storage locations.

2. A method according to claim 1,
    wherein at least some of the files have not been previously copied to another storage location; and
    wherein said causing the visual indication of the copy history to be presented comprises causing the representations of the files that have not been previously copied to another storage location to be visually distinguishable on the screen from the representations of any of the previously copied files.

3. A method according to claim 2, wherein said causing the representations of the files that have not been previously copied to another storage location to be visually distinguishable comprises causing the representations of the files that have not been previously copied to another storage location to be presented without any visual indication of a copy history.

4. A method according to claim 1, wherein said causing the visual indication of the copy history of the previously copied files comprises, for each group of one or more files that were previously copied to a same one of the two or more other storage locations, causing a background surrounding the representation of said one or more files to be visually distinct from a background surrounding the representation of one or more files that were previously copied to another one of the two or more other storage locations.

5. A method according to claim 1, further comprising receiving user input requesting the copy history; and
    wherein said accessing the information and said causing the visual indication are performed in response to receipt of the user input requesting the copy history.

6. An apparatus comprising at least one processor and at least one memory including computer program code, the at least one memory and the computer program code configured to, with the processor, cause the apparatus to at least:
    cause presentation on a screen of representations of each of a plurality of files that are stored in a first storage location;
    access information regarding a copy history of the plurality of files, the copy history indicating which of the files have been previously copied from the first storage location to any one of two or more other storage locations, said information identifying, for each of the previously copied files, at least one of the two or more other storage locations;
    cause a visual indication of the copy history to be presented in conjunction with the representations of the plurality of files;

cause visual indications of the copy history of the files previously copied to different ones of the two or more other storage locations to be presented on the screen in different respective manners visually distinct from one another; and cause a legend to be presented that indicates, for each of the previously copied files, the at least one of the two or more other storage locations.

7. An apparatus according to claim 6,
wherein at least some of the files have not been previously copied to another storage location; and
wherein the at least one memory and the computer program code are configured to, with the processor, cause the apparatus to cause the visual indication of the copy history to be presented by causing the representations of the files that have not been previously copied to another storage location to be visually distinguishable on the screen from the representations of any of the previously copied files.

8. An apparatus according to claim 7, wherein the at least one memory and the computer program code are configured to, with the processor, cause the apparatus to cause the representations of the files that have not been previously copied to another storage location to be visually distinguishable by causing the representations of the files that have not been previously copied to another storage location to be presented without any visual indication of a copy history.

9. An apparatus according to claim 6, wherein the at least one memory and the computer program code are further configured to, with the processor, cause the apparatus to cause the visual indication of the copy history of the previously copied files to be presented by, for each group of one or more files that were previously copied to a same one of the two or more other storage locations, causing a background surrounding the representation of said one or more files to be visually distinct from a background surrounding the representation of one or more files that were previously copied to another one of the two or more other storage locations.

10. An apparatus according to claim 6,
wherein the at least one memory and the computer program code are further configured to, with the processor, cause the apparatus to receive user input requesting the copy history; and
wherein the at least one memory and the computer program code are configured to, with the processor, cause the apparatus to access the information and cause the visual indication of the copy history to be presented in response to receipt of the user input requesting the copy history.

11. A computer program product comprising at least one non-transitory computer-readable storage medium having computer-executable program code portions stored therein, the computer-executable program code portions comprising program code instructions for:

causing presentation on a screen of representations of each of a plurality of files that are stored in a first storage location;

accessing information regarding a copy history of the plurality of files, the copy history indicating which of the files have been previously copied from the first storage location to any one of two or more other storage locations, said information identifying, for each of the previously copied files, at least one of the two or more other storage locations; and causing a visual indication of the copy history to be presented in conjunction with the representations of the plurality of files;

wherein said causing the visual indication of the copy history comprises causing visual indications of the copy history of the files previously copied to different ones of the two or more other storage locations to be presented on the screen in different respective manners visually distinct from one another; and wherein the computer-executable program code portions further comprise program code instructions for causing a legend to be presented that indicates, for each of the previously copied files, the at least one of the two or more other storage locations.

12. A computer program product according to claim 11,
wherein at least some of the files have not been previously copied to another storage location; and
wherein the program code instructions for causing the visual indication of the copy history to be presented comprise program code instructions for causing the representations of the files that have not been previously copied to another storage location to be visually distinguishable on the screen from the representations of any of the previously copied files.

13. A computer program product according to claim 12, wherein the program code instructions for causing the representations of the files that have not been previously copied to another storage location to be visually distinguishable comprise program code instructions for causing the representations of the files that have not been previously copied to another storage location to be presented without any visual indication of a copy history.

14. A computer program product according to claim 11, wherein the program code instructions for causing the visual indication of the copy history of the previously copied files comprises, for each group of one or more files that were previously copied to a same one of the two or more other storage locations, causing a background surrounding the representation of said one or more files to be visually distinct from a background surrounding the representation of one or more files that were previously copied to another one of the two or more other storage locations.

15. A method comprising:
causing presentation of representations of each of a plurality of files that are stored in a first storage location;

accessing information regarding a copy history of the plurality of files, the copy history indicating which of the files have been previously copied from the first storage location to another storage location; and causing a visual indication of the copy history to be presented in conjunction with the representations of the plurality of files;

wherein the information regarding the copy history of the plurality of files identifies, for each of the previously copied files, a respective storage location to which the previously copied file was copied;

wherein said causing the visual indication of the copy history to be presented comprises causing the visual indication of the copy history to be presented in a manner that visually indicates the respective storage location; and wherein said causing the visual indication of the copy history to be presented further comprises, for each group of one or more files that were previously copied to a same respective storage location, causing a background surrounding the representation of said one or more files to be visually distinct from a background surrounding the representation of one or more files that were previously copied to a different storage location.

16. An apparatus comprising at least one processor and at least one memory including computer program code, the at least one memory and the computer program code configured to, with the processor, cause the apparatus to at least:
cause presentation of representations of each of a plurality of files that are stored in a first storage location;
access information regarding a copy history of the plurality of files, the copy history indicating which of the files have been previously copied from the first storage location to another storage location; and
cause a visual indication of the copy history to be presented in conjunction with the representations of the plurality of files;
wherein the information identifies, for each of the previously copied files, a respective storage location to which the previously copied file was copied;
wherein the at least one memory and the computer program code are configured to, with the processor, cause the apparatus to cause the visual indication of the copy history to be presented by causing the visual indication of the copy history to be presented in a manner that visually indicates the respective storage location; and
wherein the at least one memory and the computer program code are further configured to, with the processor, cause the apparatus to cause the visual indication of the copy history to be presented by, for each group of one or more files that were previously copied to a same respective storage location, causing a background surrounding the representation of said one or more files to be visually distinct from a background surrounding the representation of one or more files that were previously copied to a different storage location.

17. A computer program product comprising at least one non-transitory computer-readable storage medium having computer-executable program code portions stored therein, the computer-executable program code portions comprising program code instructions for:
causing presentation of representations of each of a plurality of files that are stored in a first storage location;
accessing information regarding a copy history of the plurality of files, the copy history indicating which of the files have been previously copied from the first storage location to another storage location; and
causing a visual indication of the copy history to be presented in conjunction with the representations of the plurality of files;
wherein the information identifies, for each of the previously copied files, a respective storage location to which the previously copied file was copied;
wherein the program code instructions for causing the visual indication of the copy history to be presented comprise program code instructions for causing the visual indication of the copy history to be presented in a manner that visually indicates the respective storage location; and
wherein the program code instructions for causing the visual indication of the copy history to be presented further comprise, for each group of one or more files that were previously copied to a same respective storage location, program code instructions for causing a background surrounding the representation of said one or more files to be visually distinct from a background surrounding the representation of one or more files that were previously copied to a different storage location.

* * * * *